United States Patent
Takagi et al.

(10) Patent No.: US 9,958,040 B2
(45) Date of Patent: May 1, 2018

(54) TENSIONER AND ROCKING LEVER

(71) Applicant: TSUBAKIMOTO CHAIN CO., Osaka-shi, Osaka (JP)

(72) Inventors: Yasuyuki Takagi, Osaka (JP); Osamu Yoshida, Osaka (JP); Munehiro Maeda, Osaka (JP); Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 253 days.

(21) Appl. No.: 14/931,207

(22) Filed: Nov. 3, 2015

(65) Prior Publication Data
US 2016/0123436 A1    May 5, 2016

(30) Foreign Application Priority Data

Nov. 5, 2014  (JP) .................................. 2014-225112

(51) Int. Cl.
*F16H 7/08*  (2006.01)

(52) U.S. Cl.
CPC ............ *F16H 7/08* (2013.01); *F16H 7/0836* (2013.01); *F16H 2007/0806* (2013.01); *F16H 2007/0872* (2013.01); *F16H 2007/0893* (2013.01)

(58) Field of Classification Search
CPC ............... F16H 7/08; F16H 2007/0806; F16H 2007/0872
USPC ........................................................ 474/111
See application file for complete search history.

(56) References Cited

U.S. PATENT DOCUMENTS

| 5,184,982 | A | * | 2/1993 | Shimaya | ............... | F16H 7/0848 474/101 |
| 5,989,139 | A | * | 11/1999 | Dusinberre, II | .......... | F16H 7/08 474/110 |
| 6,120,402 | A | * | 9/2000 | Preston | ..................... | F16H 7/08 474/109 |
| 6,244,981 | B1 | * | 6/2001 | Simpson | ............... | F16H 7/0848 474/110 |
| 6,312,351 | B1 | * | 11/2001 | Simpson | ............... | F16H 7/0848 474/109 |

(Continued)

FOREIGN PATENT DOCUMENTS

| CN | 103925348 A | 7/2014 |
| JP | 2011-179620 A | 9/2011 |

(Continued)

*Primary Examiner* — William E Dondero
*Assistant Examiner* — Mark K Buse
(74) *Attorney, Agent, or Firm* — Westerman, Hattori, Daniels & Adrian, LLP (57) ABSTRACT

An object of the present invention is to provide a tensioner and a rocking lever that have simple configurations and that enable an increase in the volume of a space provided inside a plunger, the tensioner and the rocking lever being capable of preventing a stopper pin from being damaged or falling out. A plunger pin hole 121 is formed in a plunger 120 of a tensioner 100. In a tensioner body 110, a body pin hole 113 is formed in a tip protruding portion 112 provided so as to protrude from a side of an opening of the plunger housing hole 121. One of lips 154 provided on opposite sides, in a width direction, of the pressing surface 153 of a rocking lever 150 so as to protrude from the pressing surface 153, has a thinned portion 155 thinned in the width direction.

3 Claims, 6 Drawing Sheets

(56) References Cited

U.S. PATENT DOCUMENTS

| | | | | |
|---|---|---|---|---|
| 6,447,415 B1* | 9/2002 | Hashimoto | F16H 7/08 | 474/109 |
| 6,602,154 B1* | 8/2003 | Guichard | F16H 7/08 | 474/101 |
| 6,612,952 B1* | 9/2003 | Simpson | F16H 7/08 | 474/111 |
| 6,852,049 B2* | 2/2005 | Markley | F16H 7/0848 | 474/109 |
| 6,890,277 B2* | 5/2005 | Inoue | F16H 7/18 | 474/111 |
| 7,677,999 B2* | 3/2010 | Sato | F16H 7/0848 | 474/109 |
| 2003/0139237 A1* | 7/2003 | Konno | F16H 7/18 | 474/111 |
| 2003/0144101 A1* | 7/2003 | Konno | F16H 7/08 | 474/111 |
| 2004/0147350 A1* | 7/2004 | Kurohata | F16H 7/18 | 474/111 |
| 2005/0026730 A1* | 2/2005 | Hashimoto | F16H 7/18 | 474/111 |
| 2006/0046882 A1* | 3/2006 | Assel | F16H 7/08 | 474/111 |
| 2006/0094548 A1 | 5/2006 | Sato et al. | | |
| 2010/0248876 A1* | 9/2010 | Kroon | F01L 1/02 | 474/111 |
| 2011/0287880 A1* | 11/2011 | Hayami | F16H 7/0848 | 474/111 |
| 2013/0035184 A1* | 2/2013 | Konno | F16H 7/18 | 474/111 |
| 2014/0100068 A1* | 4/2014 | Kurematsu | F16H 7/08 | 474/110 |
| 2014/0200104 A1* | 7/2014 | Kurematsu | F16H 7/08 | 474/110 |

FOREIGN PATENT DOCUMENTS

| | | |
|---|---|---|
| JP | 2001-153194 A | 6/2013 |
| JP | 2014-134263 A | 7/2014 |

* cited by examiner

Related Art

Fig. 8

Related Art

TENSIONER AND ROCKING LEVER

BACKGROUND OF THE INVENTION

1. Field of the Invention

The present invention relates to a tensioner including a tensioner body having a cylindrical plunger housing hole that is open at one end, a cylindrical plunger slidably inserted into the plunger housing hole, and bias means for biasing the plunger in a protruding direction, and a rocking lever having a guide surface that comes into sliding contact with a traveling endless transmission member, a boss portion supported so as to be able to rock, and a pressing surface provided on a side of the rocking lever opposite to the guide surface.

2. Description of the Related Art

A tensioner and a swinging lever are conventionally commonly used to properly maintain the tension of an endless transmission member such as a traveling chain. For example, a chain guide mechanism for a timing system is well known in which a traveling guide shoe is used to slidably guide a transmission chain such as a roller chain endlessly passed between sprockets provided on a crank shaft and a cam shaft in an engine room and in which a tensioner is used to bias a rocking lever with the traveling guide shoe in order to properly maintain tension.

Figure 7:
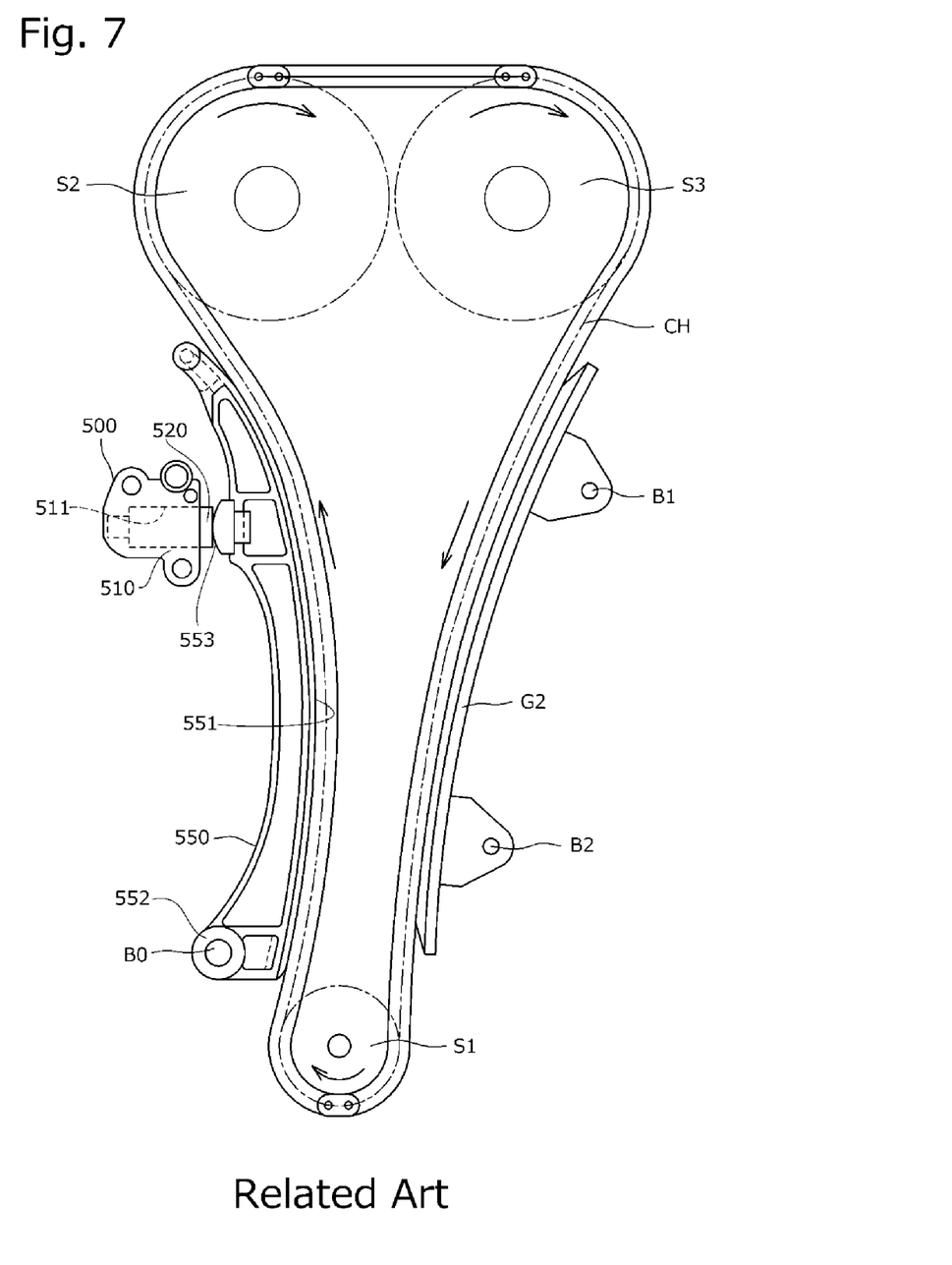
FIG. 7 is a diagram illustrating a timing system for an engine.

In the timing system for the engine, for example, as depicted in FIG. 7, a timing chain CH is endlessly passed between a driving sprocket S1 attached to a crank shaft in the engine room and a pair of driven sprockets S2 and S3 attached to a cam shaft in the engine room. The timing chain CH is guided by a rocking lever 550 and a fixed chain guide G2.

The fixed chain guide G2 is fixed in the engine room using two attachment shafts B1 and B2. The rocking lever 550 is attached to the inside of the engine room so as to be able to rock in a passage plane for the timing chain CH.

A chain tensioner 500 presses the rocking lever 550 to properly maintain the tension of the timing chain CH while suppressing vibration.

Figure 8:
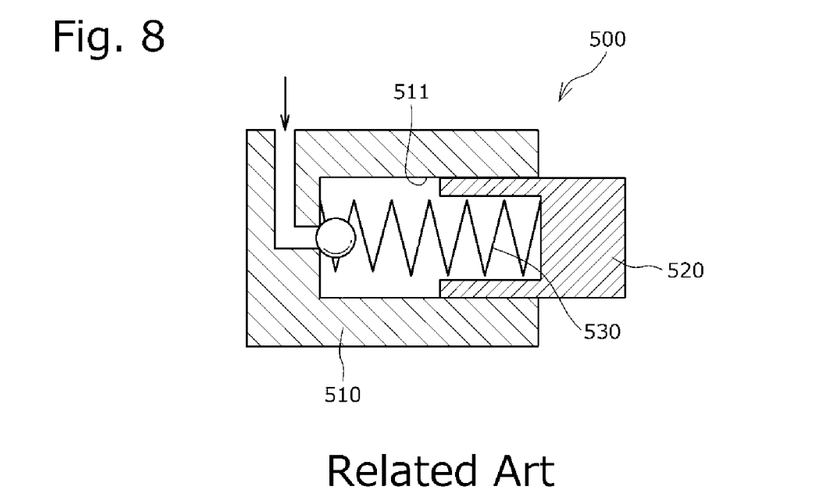
FIG. 8 is a schematic diagram illustrating a conventional tensioner.

The well-known tensioner 500 used to press the rocking lever 550 includes a tensioner body 510 having a cylindrical plunger housing hole 511 that is open at one end, a cylindrical plunger 520 slidably inserted into the plunger housing hole 511, and bias means including a coil spring 530 that biases the plunger 520 in a protruding direction through the plunger housing hole 511, for example, as schematically depicted in FIG. 8.

Oil is fed into the plunger housing hole 511 to bias the plunger 520 in the protruding direction. As the plunger 520 makes reciprocating motion, the oil flows through a small gap between the plunger 520 and the plunger housing hole 511. The resultant channel resistance produces a damping effect that dampens the reciprocating motion of the plunger 520.

As depicted in FIG. 7, the well-known rocking lever 550 pressed against the tensioner 500 has a guide surface 551 that comes into sliding contact with the traveling timing chain CH, a boss portion 552 supported by an attachment shaft B0 so as to be able to rock, and a pressing surface 553 provided on a side of the rocking lever opposite to the guide surface 551.

In such a timing system, when the tensioner is assembled or removed for maintenance, the plunger needs to be fixed at a position to which the plunger is pushed back, so as not to protrude from the tensioner body.

Thus, a technique is known in which a body pin hole (pin through-hole 11b) is formed in a tensioner body (tensioner main body 11) and in which a stopper pin (S) is inserted through the body pin hole and locked in a ring-like pin locking groove (12b) formed in a plunger (12) to fix the plunger, for example, as depicted in Japanese Patent Application Laid-open No. 2001-153194.

However, in the technique described in Japanese Patent Application Laid-open No. 2001-153194, since the body pin hole (pin through-hole 11b) is formed in the tensioner body (tensioner main body 11), the ring-like pin locking groove (12b) needs to be formed at a certain distance from a tip of the plunger (12). Thus, the volume of a space provided inside the plunger (12) is limited.

Furthermore, the stopper pin (S) is locked only along a length equal to the depth of the ring-like pin locking groove (12b) and thus a heavy load is placed on the stopper pin (S). Consequently, the stopper pin may be damaged or fall out, leading to abrupt protrusion of the plunger (12).

Meanwhile, a rocking lever is known in which, to position the plunger in a width direction of a pressing surface when a tip portion of the plunger comes into abutting contact with the pressing surface, lips protruding from the pressing surface are provided on opposite sides of the pressing surface in the width direction.

In particular, when an oil chamber is formed inside the plunger and oil is fed into the plunger through a side surface thereof, the plunger needs to be prevented from rotating so as to avoid changing the position of an oil feeding hole of the plunger in a circumferential direction. A technique is well known in which the tensioner itself has no locking mechanism and in which two parallel tip side surfaces are provided at a protruding end of the plunger such that the lips of the rocking lever are used for locking.

Such lips come into abutting contact with or come very close to the plunger protruding side of the tensioner body when the plunger lies at a position where the plunger is pushed back.

Thus, when the rocking lever with the lips is used, the body pin hole in the tensioner body needs to be located further away from the tip of the plunger, disadvantageously further limiting the volume of the space provided inside the plunger.

SUMMARY OF THE INVENTION

The present invention solves these problems. An object of the present invention is to provide a tensioner and a rocking lever that have simple configurations and that enable an increase in the volume of a space provided inside a plunger without limiting the space, the tensioner and the rocking lever being capable of preventing a stopper pin from being damaged or falling out in spite of a heavy load placed on the stopper pin.

A tensioner according to the present invention includes a tensioner body having a cylindrical plunger housing hole that is open at one end, a cylindrical plunger slidably inserted into the plunger housing hole, and bias means for biasing the plunger in a protruding direction. The tensioner allows the above-described object to be accomplished using the following configuration. A plunger pin hole is formed in the plunger. A body pin hole is formed in the tensioner body such that, at a position to which the plunger is pushed back, the body pin hole aligns with an axis of the plunger pin hole. The body pin hole is formed in a tip protruding portion provided so as to protrude from a side of an opening of the plunger housing hole.

A rocking lever according to the present invention has a guide surface that comes into sliding contact with a traveling endless transmission member, a boss portion supported so as to be able to rock, and a pressing surface provided on a side of the rocking lever opposite to the guide surface. The rocking lever allows the above-described object to be accomplished using the following configuration. Lips protruding from the pressing surface are provided on opposite sides of the pressing surface in a width direction thereof. At least one of the lips has a thinned portion thinned in the width direction.

In the tensioner in a first aspect, the plunger pin hole is formed in the plunger, and the body pin hole is formed in the tip protruding portion provided so as to protrude from the side of the opening of the plunger housing hole. Thus, the plunger pin hole can be formed very close to a tip portion of the plunger. This enables an increase in the volume of a space provided inside the plunger without limiting the space.

Since the space provided inside the plunger is not limited, the plunger pin hole can be formed to be deeper, allowing the stopper pin to be prevented from being damaged or falling out in spite of a heavy load placed on the stopper pin.

In a configuration in a second aspect, the plunger pin hole is formed to extend along a diameter line orthogonal to a central axis of the plunger. Thus, the plunger pin hole can be formed to be much deeper.

Furthermore, since the plunger pin hole is orthogonal to the central axis of the plunger corresponding to the center of the force of the plunger in the protruding direction, the stopper pin is restrained from being subjected to a load in a twisting direction. This allows the stopper pin to be more reliably prevented from being damaged or falling out.

In a configuration in a third aspect, the plunger has two parallel tip side surfaces located at a protruding end of the plunger and extending orthogonally to the plunger pin hole, and the plunger pin hole is formed in at least one of the tip side surfaces. The tip side surfaces are regulated by the lips of the rocking lever to prevent the plunger from rotating.

The plunger pin hole can be processed to be perpendicular to a plane. This allows the accuracy of the position and direction of the plunger pin hole to be easily improved, allowing the stopper pin to be more reliably prevented from being damaged or falling out.

In the rocking lever in a fourth aspect, the lips protruding from the pressing surface are provided on the opposite sides of the pressing surface in the width direction thereof, and at least one of the lips has the thinned portion thinned in the width direction. Thus, even when a tensioner is used in which the body pin hole is formed in the tip protruding portion provided so as to protrude from the side of the opening of the plunger housing hole, the thinned portion is positioned between the tip protruding portion and the plunger to allow the lips to accomplish the function thereof without interfering with the tip protruding portion. Consequently, the volume of the space can be increased without limiting the space provided inside the plunger. This enables the use of a tensioner that allows the stopper pin to be prevented from being damaged or falling out in spite of a heavy load placed on the stopper pin.

In a configuration in a fifth aspect, the thinned portion has a clearance groove that serves to avoid interference with the stopper pin of the tensioner. Thus, when the tensioner is assembled, the rocking lever need not be retracted from the tensioner, facilitating assembly and maintenance operations.

When the tensioner is removed for maintenance, the rocking lever is pushed to push the plunger into the tensioner body, enabling the stopper pin to be inserted. This improves workability.

In a configuration in a sixth aspect, a protruding portion, which comes into contact with the tensioner body of the tensioner before the lips come into contact with the tensioner body, is provided near the pressing surface. Thus, for an engine with a high input, the thinned portion, which is low in strength, can be prevented from coming into contact with the tensioner body and thus from being damaged.

DESCRIPTION OF THE PREFERRED EMBODIMENTS

A tensioner according to the present invention includes a tensioner body having a cylindrical plunger housing hole that is open at one end, a cylindrical plunger slidably inserted into the plunger housing hole, and bias means for biasing the plunger in a protruding direction. A plunger pin hole is formed in the plunger. A body pin hole is formed in the tensioner body such that, at a position to which the plunger is pushed back, the body pin hole aligns with an axis of the plunger pin hole. The body pin hole is formed in a tip protruding portion provided so as to protrude from a side of an opening of the plunger housing hole. Furthermore, a rocking lever according to the present invention has a guide surface that comes into sliding contact with a traveling endless transmission member, a boss portion supported so as to be able to rock, and a pressing surface provided on a side of the rocking lever opposite to the guide surface. Lips protruding from the pressing surface are provided on opposite sides of the pressing surface in a width direction thereof. At least one of the lips has a thinned portion thinned in the width direction. The tensioner and the rocking lever may have any specific configurations as long as the configurations are simple and enable an increase in the volume of a space provided inside the plunger, without limiting the space, and are capable of preventing a stopper pin from being damaged or falling out in spite of a heavy load placed on the stopper pin.

For example, the inside of the tensioner may have any well-known structure, and any material and the like may be used for the rocking lever.

Embodiment 1

A tensioner 100 and a rocking lever 150 according to a first embodiment of the present invention will be described based on the drawings.

As FIG. 1, FIG. 2, FIG. 5, and FIG. 6, the tensioner 100 includes tensioner body 110 having a cylindrical plunger housing hole 111 that is open at one end, a cylindrical plunger 120 slidably inserted into the plunger housing hole 111, and bias means for biasing the plunger 120 in a protruding direction, such as a coil spring housed in the plunger housing hole 111.

Figure 2:
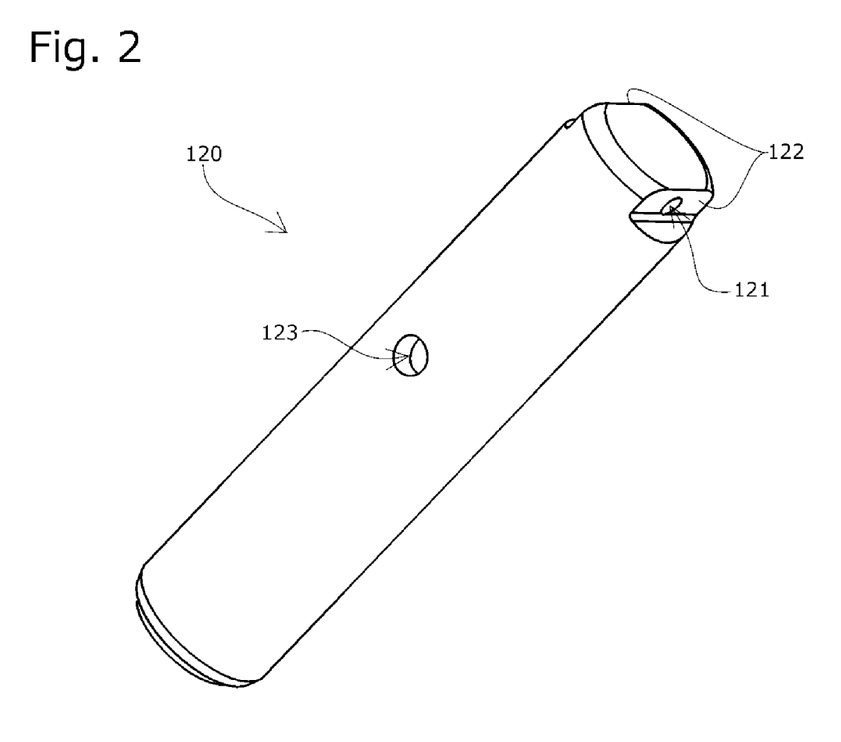
FIG. 2 is a perspective view of a plunger of the tensioner according to the embodiment of the present invention.
Figure 3:
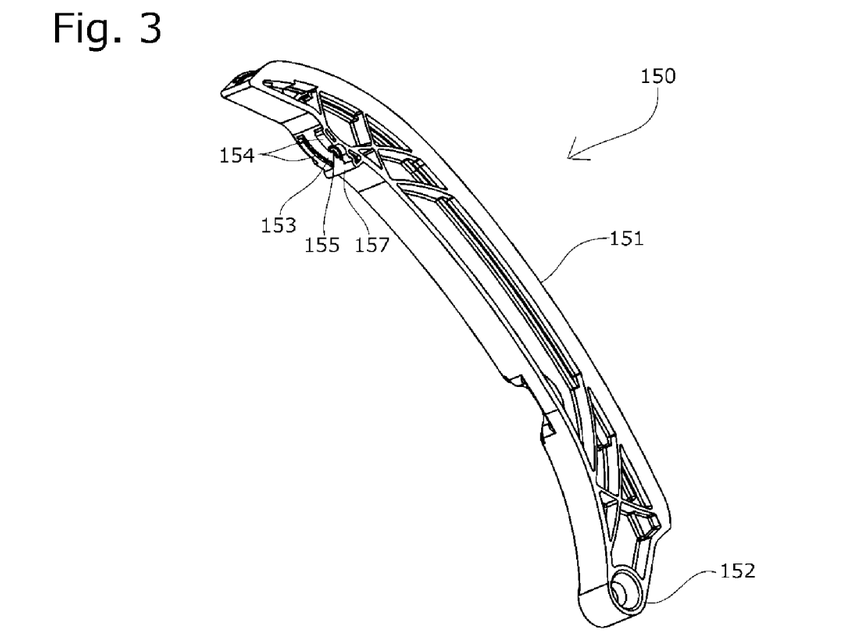
FIG. 3 is a perspective view of a rocking lever according to the embodiment of the present invention.
Figure 4:
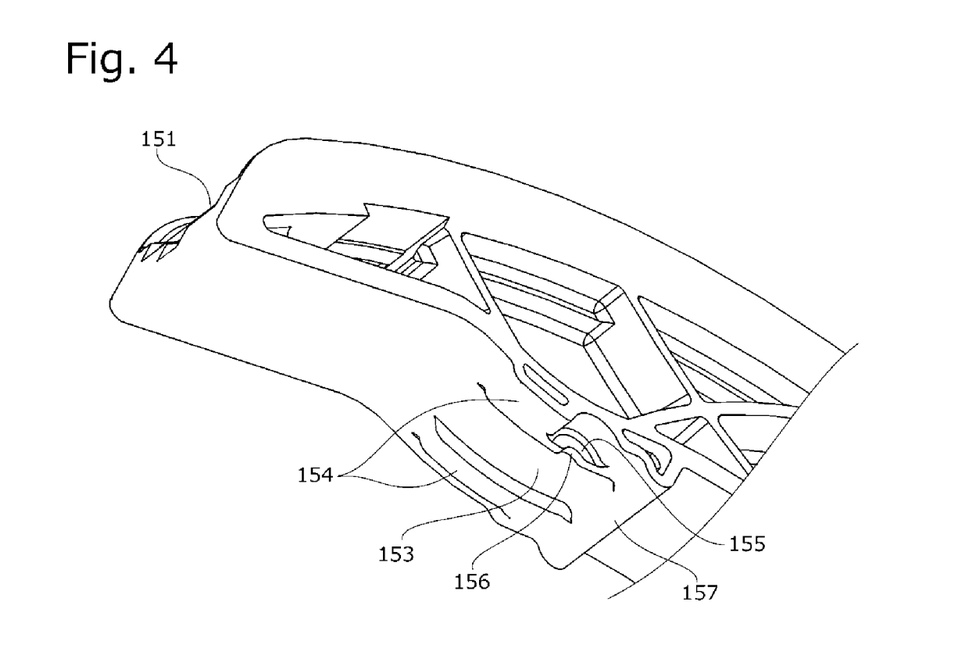
FIG. 4 is a partially enlarged perspective view of the rocking lever in FIG. 3.

As depicted in FIG. 2, the plunger 120 has two parallel tip side surfaces 122 at a protruding end of the plunger 120. A plunger pin hole 121 is formed in the center of one of the tip side surfaces 122.

The plunger pin hole 121 extends along a diameter line orthogonal to the tip side surfaces 122 and to a central axis of the plunger 120.

The plunger pin hole 121 may have any depth as long as the depth is sufficient to fix the plunger 120 so as to prevent the plunger 120 from protruding from the tensioner body 110 at a position to which the plunger 120 is pushed back by a stopper pin 140 described below. The plunger pin hole 121 may penetrate the plunger 120 to the opposite tip side surface 122.

In the tensioner 100 in the present embodiment, an oil chamber is formed inside the plunger 120, and oil is fed into the plunger 120 through a side surface thereof. A feeding hole 123 is formed in a cylindrical surface of the plunger 120.

Furthermore, the tip side surfaces 122 are sandwiched in a width direction between lips 154 of the rocking lever 150 described below to prevent the plunger 120 from rotating so as to avoid changing the position of the feeding hole 123 in a circumferential direction.

Figure 1:
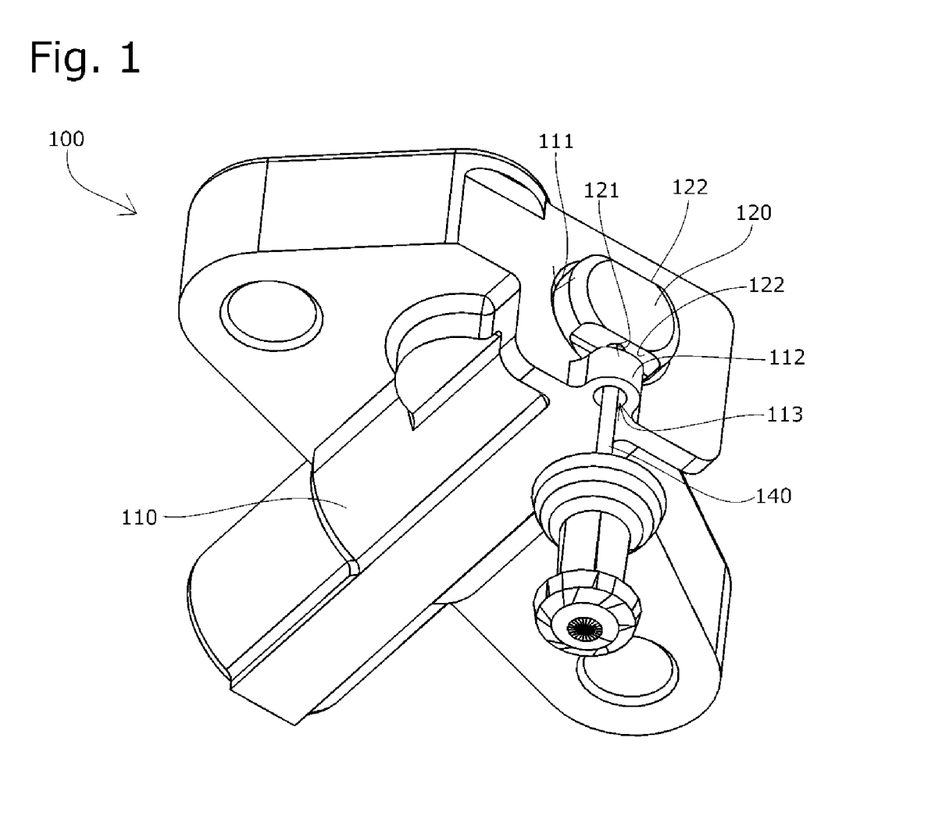
FIG. 1 is a perspective view of a tensioner according to an embodiment of the present invention.

As depicted in FIG. 1 and the like, a tip protruding portion 112 is provided on the tensioner body 110 so as to protrude from a side of the opening of the plunger housing hole 111. A body pin hole 113 is formed in the tip protruding portion 112 such that, at a position to which the plunger 120 is pushed back, the body pin hole 113 aligns with an axis of the plunger pin hole 121.

When the tensioner 100 is assembled or removed for maintenance, the stopper pin 140 is inserted into the plunger pin hole 121 through the body pin hole 113 to fix and prevent the plunger 120 from protruding from the tensioner body 110 at the position to which the plunger 120 is pushed back, as depicted in FIG. 1.

As depicted in FIGS. 3 to 6, the rocking lever 150 has a guide surface 151 that comes into sliding contact with a traveling chain (not depicted in the drawings), a boss portion 152 supported so as to be able to rock, and a pressing surface 153 provided on a side of the rocking lever opposite to the guide surface 151.

Lips 154 protruding from the pressing surface 153 are provided on opposite sides of the pressing surface 153 in a width direction thereof. At least one of the lips 154 (the lip 154 closer to the reader in FIG. 2) has a thinned portion 155 thinned in the width direction.

Figure 5:
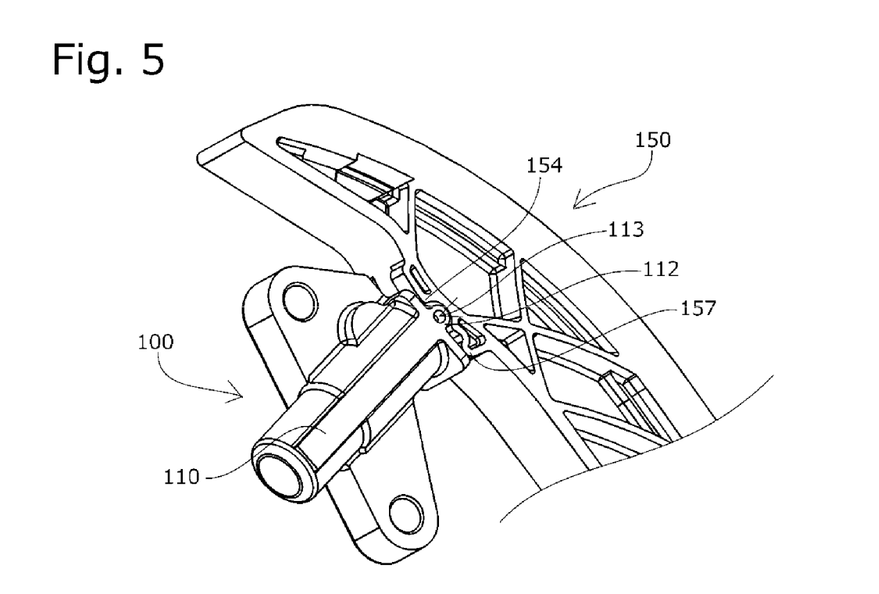
FIG. 5 is a perspective view of a tensioner unit according to the embodiment of the present invention.
Figure 6:
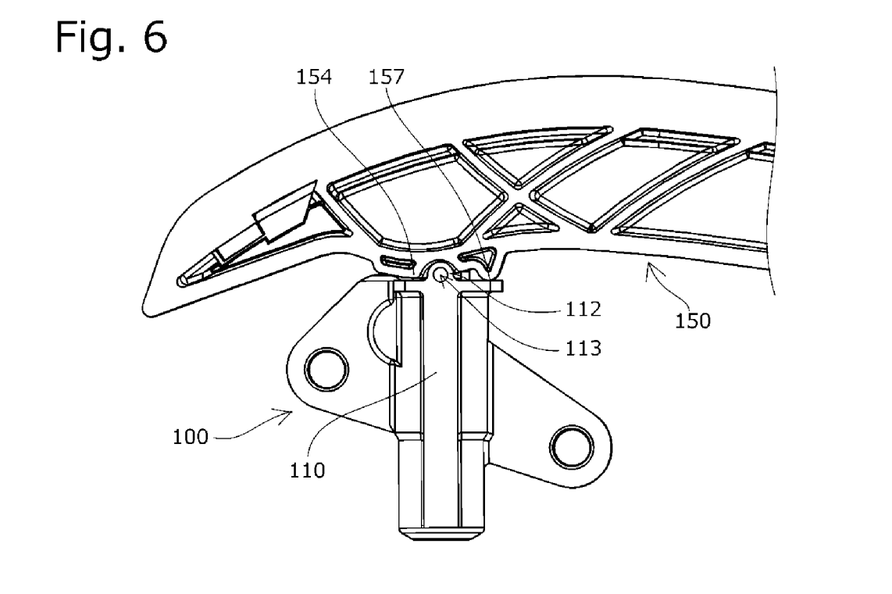
FIG. 6 is a partially enlarged front view of the tensioner unit in FIG. 5.

As depicted in FIG. 5 and FIG. 6, the thinned portion 155 is formed in the lip 154 within a range in which the thinned portion 155 does not interfere with the tip protruding portion 112 when the rocking lever 150 rocks farthest toward the tensioner 100. The thinned portion 155 is formed to have a thickness that enables the thinned portion 155 to be smoothly placed between the tip side surface 122 of the plunger 120 of the tensioner 100, described above, and the tip protruding portion 112 of the tensioner body 110.

A clearance groove 156 is also formed at an edge of the thinned portion 155 to avoid interference with the stopper pin 140 inserted into the tensioner 100.

A protruding portion 157 is provided adjacently to the pressing surface 153 on a side thereof that is closer to the boss portion 152 so as to come into contact with the tensioner body 110 of the tensioner 100 before the lips 154 come into contact with the tensioner body 110 when the rocking lever 150 rocks farthest toward the tensioner 100.

The protruding portion 157 may be provided at any position as long as the position is near the pressing surface 153 and at the position, the protruding portion 157 can come into contact with the tensioner body 110.

In the present embodiment, the protruding portion 157 is formed to extend all over the width of the rocking lever 150 and thus comes into contact with the tensioner body 110 over a sufficient width, resulting in a reduced surface pressure and enhanced durability.

The above-described embodiment is a specific example of the tensioner and the rocking lever according to the present invention. However, the tensioner and the rocking lever according to the present invention are not limited to those described above. Variations may be made to the shapes, positions, sizes, arrangement relations, and the like of the components.

For example, the tensioner may include a tip protruding portion with body pin holes on a side of the opening at 180° from each other. The plunger pin hole may penetrate the plunger from one of the tip side surface to the other tip side surface. The stopper pin bridges the body pin holes in the opposite tip protruding portion. The thinned portion of the rocking lever, which has the clearance groove, may correspondingly be formed in each of the opposite lips.

Furthermore, the tensioner and the rocking lever in the present invention are applied to a timing system in which a traveling guide shoe is used to slidably guide a transmission chain such as a roller chain endlessly passed between sprockets provided on a crank shaft and a cam shaft in an engine room. However, the present invention is not limited to such an application. The tensioner and the rocking lever in the present invention may be applied to any transmission mechanisms such as a chain, a belt, and a rope and can be utilized in various industrial fields.

What is claimed is:

1. A rocking lever comprising:
    a guide surface that comes into sliding contact with a traveling endless transmission member;
    a boss portion supported so as to be able to rock; and
    a pressing surface provided on a side of the rocking lever opposite to the guide surface, wherein
    lips protruding from the pressing surface are provided on opposite sides of the pressing surface in a width direction thereof,
    at least one of the lips has a thinned portion thinned in the width direction, and
    a protruding portion, which comes into contact with a tensioner body of a tensioner before the lips come into contact with the tensioner body, is provided near the pressing surface.

2. The rocking lever according to claim 1, wherein the thinned portion has a clearance groove that serves to avoid interference with a stopper pin of a tensioner.

3. A tensioner unit comprising:
    a tensioner and a rocking lever,
    the tensioner comprising:
    a tensioner body having a cylindrical plunger housing hole that is open at one end;
    a cylindrical plunger slidably inserted into the plunger housing hole; and bias means for biasing the plunger in a protruding direction, wherein a plunger pin hole is formed in the plunger, a body pin hole is formed in the tensioner body such that, at a position to which the plunger is pushed back, the body pin hole aligns with an axis of the plunger pin hole, and the body pin hole is formed in a tip protruding portion provided so as to protrude from a side of an opening of the plunger housing hole; and the rocking lever comprising:

a guide surface that comes into sliding contact with a traveling endless transmission member;

a boss portion supported so as to be able to rock; and a pressing surface provided on a side of the rocking lever opposite to the guide surface, wherein lips protruding from the pressing surface are provided on opposite sides of the pressing surface in a width direction thereof, and at least one of the lips has a thinned portion thinned in the width direction.

\* \* \* \* \*